United States Patent
Rajbahadur et al.

(10) Patent No.: US 12,367,427 B2
(45) Date of Patent: Jul. 22, 2025

(54) METHODS, SYSTEMS, AND MEDIA FOR ROBUST CLASSIFICATION USING ACTIVE LEARNING AND DOMAIN KNOWLEDGE

(71) Applicants: Gopi Krishnan Rajbahadur, Kingston (CA); Haoxiang Zhang, Kingston (CA); Jack Zhenming Jiang, Richmond Hill (CA)

(72) Inventors: Gopi Krishnan Rajbahadur, Kingston (CA); Haoxiang Zhang, Kingston (CA); Jack Zhenming Jiang, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 964 days.

(21) Appl. No.: 17/466,845

(22) Filed: Sep. 3, 2021

(65) Prior Publication Data
US 2023/0071240 A1 Mar. 9, 2023

(51) Int. Cl.
G06N 20/10 (2019.01)
G06F 18/21 (2023.01)
G06F 18/2431 (2023.01)

(52) U.S. Cl.
CPC ......... *G06N 20/10* (2019.01); *G06F 18/2178* (2023.01); *G06F 18/2431* (2023.01)

(58) Field of Classification Search
CPC .... G06N 20/00; G06N 20/10; G06F 18/2178; G06F 18/2431
See application file for complete search history.

(56) References Cited

U.S. PATENT DOCUMENTS

2014/0229164 A1* 8/2014 Martens ............... G06F 40/279
704/9

FOREIGN PATENT DOCUMENTS

CN 107169001 A 9/2017

OTHER PUBLICATIONS

Yu, Fisher, et al. "Lsun: Construction of a large-scale image dataset using deep learning with humans in the loop." arXiv preprint arXiv:1506.03365 (2015). (Year: 2015).*
Hashimoto, Kazuma, et al. "Topic detection using paragraph vectors to support active learning in systematic reviews." Journal of biomedical informatics 62 (2016): 59-65. (Year: 2016).*
(Continued)

*Primary Examiner* — Eric Nilsson

(57) ABSTRACT

Methods, computing systems, and computer-readable media for robust classification using active learning and domain knowledge are disclosed. In embodiments described herein, global feature data (such as a list of keywords) is generated for use in a classification task (such as a NLP text classification task). Expert knowledge, based on decisions made by human users, is combined with existing domain knowledge, which may be derived from existing trained classification models in the problem domain, such as keyword models trained using various datasets. By combining the expert knowledge with the domain knowledge, global feature data may be generated that is more effective in performing the classification task than either a classifier using the expert knowledge or a classifier using the domain knowledge.

18 Claims, 7 Drawing Sheets

(56) References Cited

OTHER PUBLICATIONS

Huang, Nantian, Guobo Lu, and Dianguo Xu. "A permutation importance-based feature selection method for short-term electricity load forecasting using random forest." Energies 9.10 (2016): 767. (Year: 2016).*
Z. Yu, C. Theisen, L. Williams, and T. Menzies, "Improving vulnerability inspection efficiency using active learning," IEEE Transactions on Software Engineering 2019.
H. Tu, Z. Yu, and T. Menzies, "Better data labelling with emblem (and how that impacts defect prediction)," IEEE Transactions on Software Engineering, 2020.
C. Rosen, B. Grawi, and E. Shihab, "Commit guru: analytics and risk prediction of software commits," in Proceedings of the 2015 10th joint meeting on foundations of software engineering 2015.
L. P. Hattori and M. Lanza, "On the nature of commits," in 2008 23rd IEEE/ACM International Conference on Automated Software Engineering-Workshops. IEEE 2008.
Z. Yu and T. Menzies, "Total recall, language processing, and software engineering," in Proceedings of the 4th ACM SIGSOFT International Workshop on NLP for Software Engineering 2018.

* cited by examiner

METHODS, SYSTEMS, AND MEDIA FOR ROBUST CLASSIFICATION USING ACTIVE LEARNING AND DOMAIN KNOWLEDGE

RELATED APPLICATION DATA

This is the first patent application related to this matter.

FIELD

The present disclosure relates to machine learning, and in particular to methods, computing systems, and computer-readable media for robust classification using active learning and domain knowledge.

BACKGROUND

Classification of input data is one of the most common applications for machine learning (ML) technologies. A model can be trained using machine learning techniques to classify input data samples, such as text samples or image samples, to determine whether the input data sample falls within one or more categories or classes. A trained classification model (also called a classifier) can be trained or otherwise constructed or configured using various machine learning approaches, such as supervised learning or unsupervised learning. Unsupervised learning uses techniques such as data clustering to train a model to classify input data samples into two or more categories based on identification of clusters of features distinctively associated with the categories. For example, a text classifier trained using unsupervised learning might be able to classify texts as being written in English or French based on clusters of features distinctive of each category (e.g., the frequency of various English words in a text and the frequency of various French words in a text), using a training dataset containing few or no labelled data samples (e.g., the training dataset may contain a small number of texts labelled "English" or "French" and a large number of samples without associated semantic labels). However, unsupervised learning is typically limited in its ability to classify input data samples into user-defined categories, and accuracy is typically lower than that of models training using supervised learning.

In contrast, supervised learning is capable of training models to classify input data samples into specific categories defined by a user, and is therefore typically more effective than unsupervised learning at constructing models trained to perform specific classification tasks. However, supervised learning requires that training data samples be labelled by a human with semantic labels indicating the ground truth classification data for each training data sample. For example, to train a model to perform a classification task classifying texts as news articles or not news articles, each text used as a training data sample needs to be labelled as "news article" or "not news article" by a human worker before the training of the model begins. As a further example, referred to repeatedly throughout this disclosure, a model can be trained to classify software commits (i.e., portions of software source code, also called "patches", that are added or "committed" to an existing repository of software source code forming the codebase for a software project) as being bug-fix commits (i.e., patches intended to solve a "bug" or defect in the software codebase) or non-bug-fix-patches by manually labelling each patch as "bug fix" or "not bug fix".

Labelling training data is extremely labor-intensive. Various attempts have been made to reduce or eliminate the need for manual data labelling by humans in order to train or construct classification models configured to perform arbitrary user-defined classification tasks, resulting in a multi-million dollar business that enables and facilitates manual, automated, or semi-automated approaches to data labelling and data classification. Four such approaches to the problem of labor-intensive manual data labelling for constructing classification models in the natural language processing (NLP) domain are outlined below.

A first approach is manual data labelling, in which human labelers manually review and label the data samples. Manual approaches to data labelling include the Amazon™ service Mechanical Turk™ (MTurk), which attempts to enable efficient manual labelling processes. Hover, any manual labelling process has certain limitations. First, manual data labelling is inherently hard to scale. Recent research (Z. Yu and T. Menzies, "Total recall, language processing, and software engineering," in Proceedings of the 4th ACM SIGSOFT International Workshop on NLP for Software Engineering, 2018, pp. 10-13) indicates that labelling a commit as a bug-fix commit or not takes a human reviewer about a minute. Which in turn would mean that labelling 22,500 commits (which is an extremely small amount compared to the number of commits included in several large scale software projects) would take about 175 person-hours. Furthermore, finding problem domain experts to label the data at scale may be difficult depending on the classification task and the nature of the data.

A second approach is keyword-based data labelling or keyword-based classification. First, a set of keywords that represent or are otherwise associated with a data label or category of interest is identified. Each data sample can then be automatically labelled or classified as being within the category of interest if the data sample contains any of the keywords. However, keyword-based labelling and classification exhibits several limitations. First, identification of the correct set of keywords for a given classification task (e.g., bug-fix commit classification) is difficult. Furthermore, naïve keyword-based labelling and classification approaches exhibit poor accuracy compared to more recently-developed active learning-based approaches described below.

A third approach is to use supervised or semi-supervised machine learning to train models using a first training dataset, and leverage the trained models to label or categorize data samples in a second dataset. Unsupervised or semi-supervised machine learning algorithms using a small proportion of labelled data samples out of a training dataset containing many unlabelled data samples, as described above, may be considered a version of this third approach. However, this approach also exhibits several limitations. First, this approach relies on at least some data samples to be labelled manually, thereby falling prey to the same limitations as the manual labelling approach described above. Second, verification of the performance of the trained model requires further manual review, which is equivalent to manual labelling in its labor requirements.

A fourth and more recently-developed approach is to use active learning to train a classification model. Active learning (AL) is increasingly popular as an approach to data labelling in research, and several automated machine learning platforms like Amazon™ SageMaker™ implement active learning techniques. Active learning uses a human-in-the-loop technique to label data samples in a dataset, attempting to incur the least possible amount of manual input from the human expert. Active learning works by building a machine learning model with human supervision such that the human-in-the-loop (i.e. the human expert supervising the training process) only has to label a small number of data points. Recent research has shown classification models trained using active learning to be highly accurate in performing classification tasks. However, active learning also has several limitations. First, the performance (i.e. accuracy of classification) of models trained using active learning, and the effort (i.e. the amount of human input required to train the model or label the dataset) using active learning, are both highly unstable and variable. Experiments indicate that an active learner technique used to classify bug-fix commits in a dataset showed significant variation in performance and effort—up to 54% variation in performance and up to 42.5% variation in effort—between different executions of the technique. Second, even small amounts of error in the performance of the human-in-the-loop of the active learning technique can severely affect both labelling performance and required effort. For instance, when an active learner is used to label bug-fix commits, human labelling errors can decrease the labelling performance by over 34% and increase the required labelling effort by the same amount. Furthermore, whereas training a classification model using active learning is typically resource intensive, the performance of the trained model does not usually generalize across different datasets in the same problem domain. This means that the model may need to be retrained for each dataset.

Existing approaches therefore exhibit one or more of several limitations, including instability (i.e. lack of consistency in the amount of human effort required to construct the classifier and/or the performance of the classifier), lack of robustness (i.e., human errors can greatly increase the amount of human effort required and/or greatly decrease performance), and/or lack of generalizability (i.e., a classifier constructed to classify one dataset does not perform well in classifying another dataset).

Thus, there exists a need for training or otherwise configuring a classification model that overcomes one or more of the shortcomings of the existing approaches described above.

SUMMARY

In various examples, the present disclosure describes methods, computing systems, and computer-readable media for robust classification using active learning and domain knowledge. In embodiments described herein, global feature data (such as a list of keywords) is generated for use in a classification task (such as a NLP text classification task). Expert knowledge, based on decisions made by human users, is combined with existing domain knowledge, which may be derived from existing trained classification models in the problem domain, such as keyword models trained using various datasets. By combining the expert knowledge with the domain knowledge, global feature data may be generated that is more effective in performing the classification task than either a classifier using the expert knowledge or a classifier using the domain knowledge.

In some examples, the expert knowledge is embodied as a first set of global features, and the domain knowledge is embodied as a second set of global features. As used herein, a "global feature" is a single value, such as a numeric, nominal, or Boolean value, that is associated with an entire data sample. Examples of global features of text data samples include a word count of the text (numeric), the language of a text as a value selected from an ordered list of languages (nominal), or the presence or absence of a keyword within the text (Boolean). Examples of global features of image data samples include an average pixel brightness of the image (numeric), or the presence or absence of a predefined visual pattern within the image (Boolean). As used herein, the term "global feature data" may refer to data that includes or is derived from a set of one or more global features, and that may be used to perform a classification task. For example, global feature data may include multiple Boolean global features, as well as data indicating how to combine those Boolean global features to perform a classification task (e.g., the global features are a set of keywords [kw1, kw2, kw3, kw4] and the global feature data also includes instructions indicating that a text is to be classified into Category A if the text contains (kw1 AND (kw2 OR kw3) AND NOT kw4)). In another example, global feature data may include a numeric global feature (e.g., average pixel brightness) and instruction for how to classify data samples based on the numeric global feature (e.g., images having an average pixel brightness greater than a predefined pixel brightness threshold are to be classified into Category A). In other examples, global feature data may include only a set of one or more global features, and logic separate from the global feature data may be applied to perform a classification task using the global feature data.

As used herein, the term "model" may refer to a mathematical or computational model. A model may be said to be implemented, embodied, run, or executed by an algorithm, computer program, or computational structure or device. In the present example embodiments, a model may refer to a classification model intended to perform a classification task on input such as text or images, and may be implemented by an algorithm trained or configured using techniques described herein.

An "input sample" may refer to any data sample used as an input to a model, such as text data or image data. It may refer to a training data sample used to train a model using machine learning, or to a data sample provided to a trained model which will infer (i.e. predict) an output based on the data sample for the task for which the model has been trained. Thus, for a model that performs a task of image classification, an input sample may be a single digital image, and for a model that performs a task of text classification, an input sample may be a single digital text (such as an ASCII text document).

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

As used herein, the terms "classification", "categorization", and "labelling" are used interchangeably and synonymously (as are "classify" and "categorize" and "label" (as a verb), "class" and "category", "classifier" and "categorizer" and "classification model" and "labeler", etc.). It will be appreciated that a model or algorithm configured to classify a data sample may also be used to generate a label corresponding to the output of the model (i.e. data identifying a class or category) and associate the label with the data sample. In some examples, the behavior of a classification model may be described as classifying an input sample into a first category or a second category; it will be appreciated that each of the first and second category may include multiple categories, e.g., the first category may be "dog" whereas the second category may include multiple categories (e.g., "cat", "human", and "truck"), none of which are "dog", such that the second category may be regarded as "not dog".

In some aspects, the present disclosure describes a method for automatically generating, using a computing system, global feature data for use in performing a classification task. The method comprises obtaining a first set of global features generated based on decisions made by one or more human users, obtaining a second set of global features generated based on one or more trained classification models, and combining the first set of global features and the second set of global features to generate the global feature data. Each trained classification model is trained using a respective training dataset.

In some aspects, the present disclosure describes a computing system comprising a processing system comprising one or more processor devices, and a memory. The memory stores instructions which, when executed by the processing system, cause the system to generate global feature data for use in performing a classification task. A first set of global features generated based on decisions made by one or more human users is obtained. A second set of global features generated based on one or more trained classification models is obtained. Each trained classification model is trained using a respective training dataset. The first set of global features and the second set of global features are combined to generate the global feature data.

By combining expert knowledge, based on decisions made by human users, with domain knowledge, based on existing classifiers trained using various existing training datasets, global feature data may be generated that is more effective in performing the classification task than either a classifier using the expert knowledge alone or a classifier using the domain knowledge alone.

In some examples, obtaining the first set of global features comprises training an active learning-based classification model using active learning based on the decisions made by the one or more human users with respect to an active learning training dataset, thereby obtaining a trained active learning-based classification model, and processing the trained active learning-based classification model to generate the first set of global features.

Active learning provides a highly effective way of extracting expert knowledge from human users requiring a minimum number of human classification decisions to be made.

In some examples, training the active learning-based classification model comprises processing at least a portion of the active learning training dataset to generate a plurality of features, processing the plurality of features to generate a plurality of classification prompts, presenting a plurality of classification prompts to the one or more human users via one or more user devices, obtaining a plurality of classification decisions based on user input received from the one or more user devices, and adjusting a plurality of learned parameters of the active learning-based classification model based on the plurality of classification decisions.

In some examples, the active learning-based classification model comprises a support-vector machine model.

In some examples, processing the trained active learning-based classification model to generate the first set of global features comprises processing the trained active learning-based classification model to identify a plurality of global features and a respective feature importance measure associated with each global feature of the plurality of global features, and selecting the first set of global features from the plurality of global features based on the respective feature importance measures of the first set of global features.

Feature importance techniques provide effective tools for extracting the most important features from a trained machine learning model.

In some examples, processing the trained active learning-based classification model to identify a respective feature importance measure associated with each global feature of the plurality of global features comprises performing permutation feature importance on the trained active learning-based classification model.

In some examples, the classification task is a text classification task, the global feature data comprises keyword data, the first set of global features comprises a plurality of keywords extracted from the trained active learning-based classification model, the one or more classification models comprise one or more keywords models, and the second set of global features comprises a plurality of keywords extracted from the one or more keyword models.

Keyword models provide an effective basis for extracting and combining domain knowledge and expert knowledge to generate global feature data (i.e. keyword data) that is effective to perform text classification tasks.

In some examples, obtaining the first set of global features comprises obtaining survey information comprising survey responses of the one or more human users, and processing the survey information to generate the first set of global features.

In some examples, the method further comprises using the global feature data to perform the classification task on a plurality of data samples that are not present in the one or more training datasets or in the active learning training dataset.

After the global feature data has been generated, it can be deployed to perform a classification task on previously unseen data samples, as the combined expert knowledge and domain knowledge may exhibit high stability, high robustness, and/or high generalizability relative to existing approaches.

In some aspects, the present disclosure describes a non-transitory computer-readable medium having instructions tangibly stored thereon, wherein the instructions, when executed by a processing system, cause the processing system to perform one or more of the methods described above.

In some aspects, the present disclosure describes a non-transitory computer-readable medium having tangibly stored thereon global feature data for use in performing a classification task. The global feature data is generated by obtaining a first set of global features generated based on decisions made by one or more human users, obtaining a second set of global features generated based on one or more trained classification models, and combining the first set of global features and the second set of global features to generate the global feature data. Each trained classification model is trained using a respective training dataset.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Example Computing System

A system or device, such as a computing system, is first described that may be used to implement examples disclosed herein.

Figure 1:
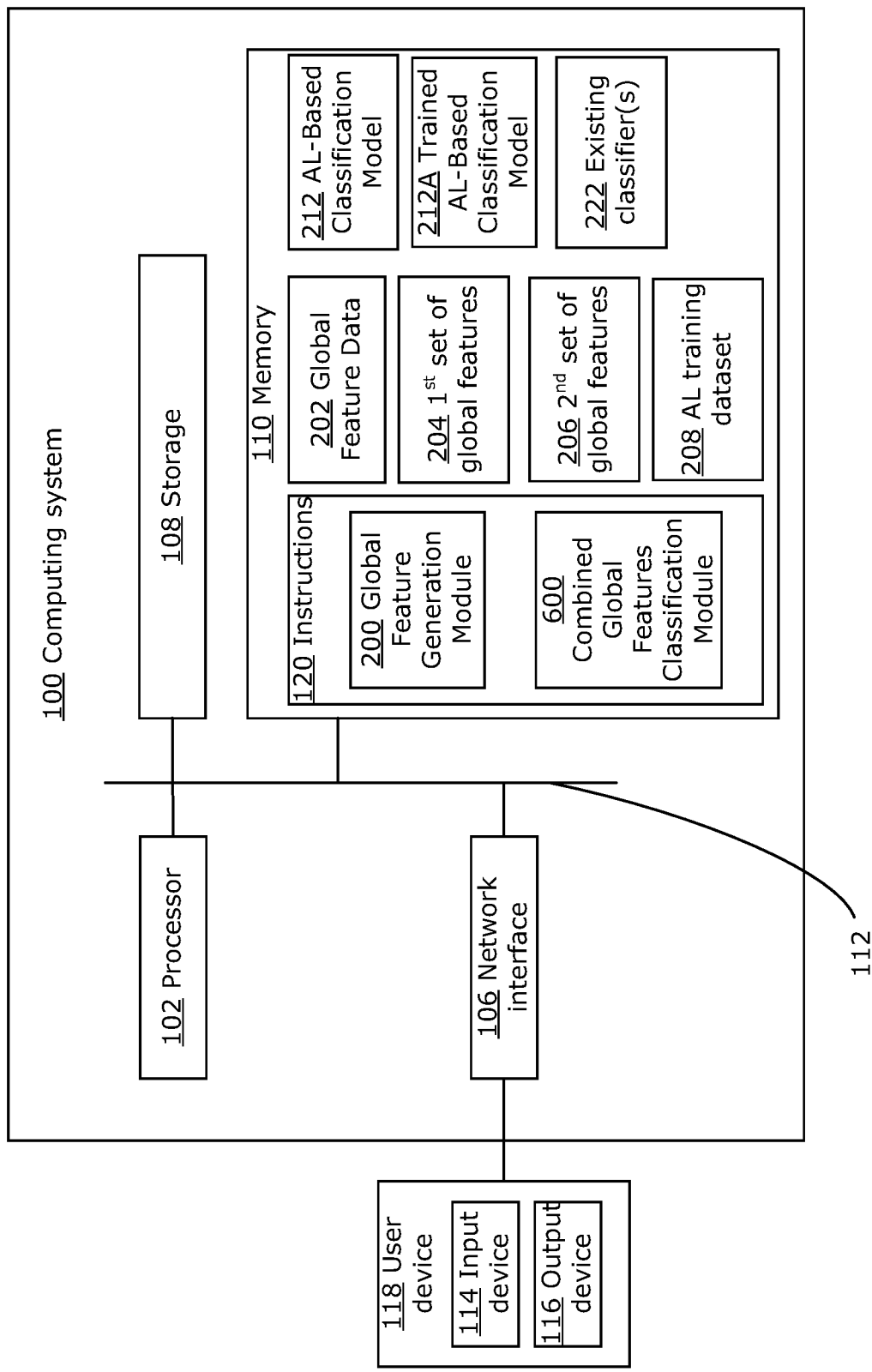
FIG. 1 is a block diagram of an example computing system that may be used to implement examples described herein.

FIG. 1 a block diagram of an example simplified computing system 100, which may be a device that is used to generate global feature data and/or use global feature data to classify data samples in accordance with examples disclosed herein. Other computing systems suitable for implementing embodiments described in the present disclosure may be used, which may include components different from those discussed below. In some examples, the computing system 100 may be implemented across more than one physical hardware unit, such as in a parallel computing, distributed computing, virtual server, or cloud computing configuration. Although FIG. 1 shows a single instance of each component, there may be multiple instances of each component in the computing system 100.

The computing system 100 may include one or more processing units (collectively referred to as processor 102), such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may include one or more network interfaces (collectively referred to as network interface 106) for wired or wireless communication with a network (e.g., an intranet, the Internet, a P2P network, a WAN and/or a LAN) or other node. The network interface 106 may include wired links (e.g., Ethernet cable) and/or wireless links (e.g., one or more antennas) for intra-network and/or inter-network communications. The network interface 106 may be used to communicate with one or more user devices 118, such as mobile devices or workstations equipped with one or more input devices 114 (such as keyboards or touchscreens) and one or more output devices 116 (such as displays or speakers). In some embodiments, the computing system 100 may be accessed directly by a user and may be considered a user device 118 itself, including an input/output interface for communicating directly with one or more input devices 114 and/or output devices 116.

The computing system 100 may also include one or more storage units (collectively referred to as storage 108), which may include a mass storage unit such as a solid state drive, a hard disk drive, a magnetic disk drive and/or an optical disk drive.

The computing system 100 may include one or more memories (collectively referred to as memory 110), which may include a volatile or non-volatile memory (e.g., a flash memory, a random access memory (RAM), and/or a read-only memory (ROM)). The non-transitory memory 110 may store instructions 120 for execution by the processor 102, including instructions for implementing a global feature generation module 200 and/or instructions for implementing a combined global features classification module 600 configured to carry out examples described in the present disclosure. The memory 110 may include other software instructions, such as for implementing an operating system and other applications/functions. The memory 110 may also store various types of data, including global feature data 202, a first set of global features 204, a second set of global features 206, and/or an active learning training dataset 208, as described further below. The memory 110 may also store data and/or instructions required to represent, train, and/or execute various models, including the learned parameter values and hyperparameter values of said models. The models stored by the memory 110 may include an active learning-based classification model 212 (as described further below), a trained active learning-based classification model 212A (e.g. the learned parameter values of the active learning-based classification model 212 after it has been trained), and/or one or more existing classifiers 222, such as existing keyword classification models.

In some other examples, one or more data sets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 112 providing communication among components of the computing system 100, including the processor 102, network interface 106, storage 108 and/or memory 110. The bus 112 may be any suitable bus architecture including, for example, a memory bus, a peripheral bus or a video bus.

Example Global Feature Generation Module

Example embodiments will now be described with reference to the global feature generation module 200 of FIG. 1. Operation of the global feature generation module 200 will be described with reference to the block diagram of FIG. 2 as well as the flowcharts shown in FIGS. 3-5.

Figure 2:
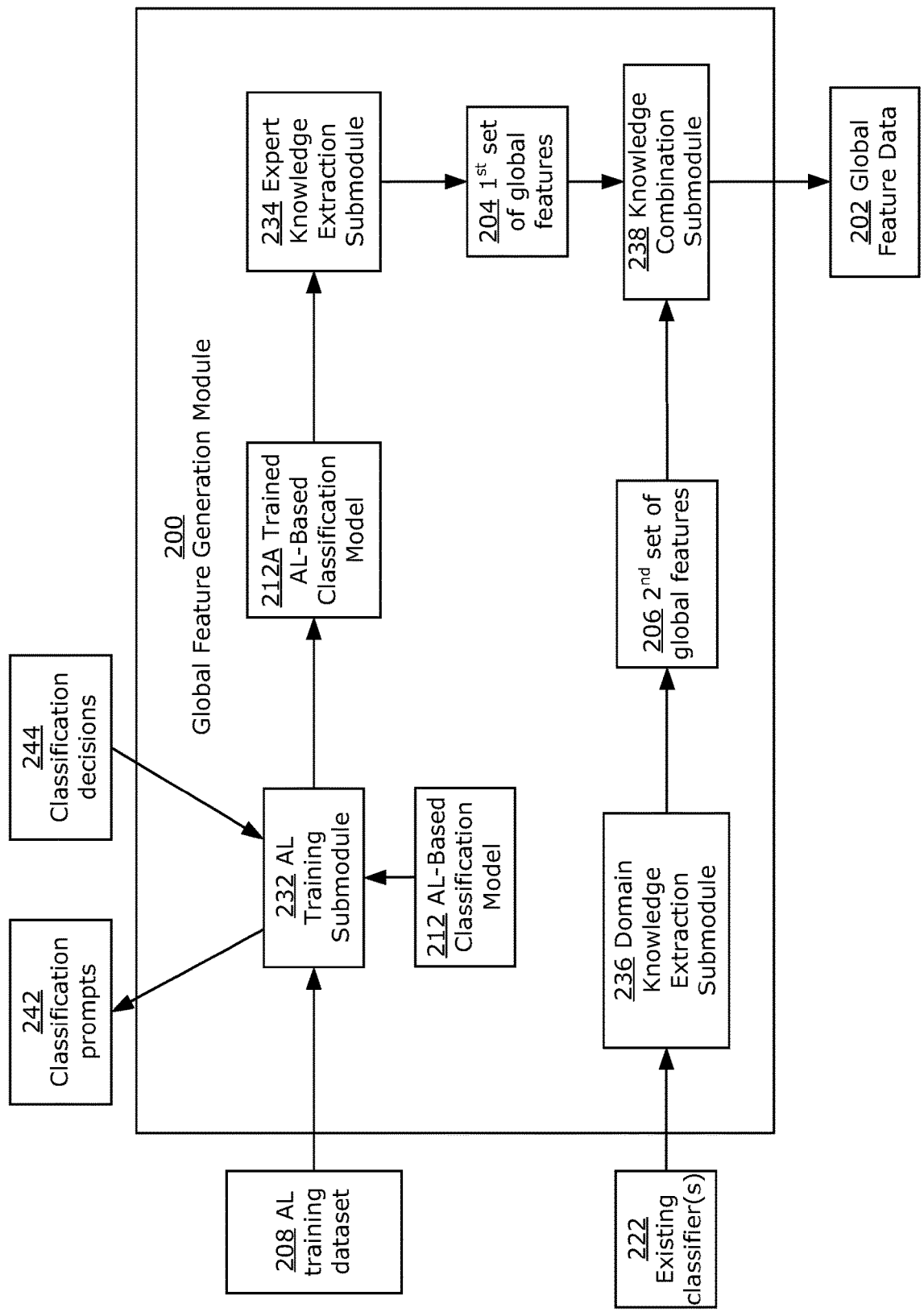
FIG. 2 is a block diagram showing operations of a global feature generation module, in accordance with the present disclosure.

FIG. 2 shows operations of the global feature generation module 200. The global feature generation module 200 includes several submodules, each of which may be implemented by execution by the processor 102 of a set of instructions 120 stored in the memory 110. The submodules include an active learning (AL) training submodule 232, an expert knowledge extraction submodule 234, a domain knowledge extraction submodule 236, and a knowledge combination submodule 238.

Figure 3:
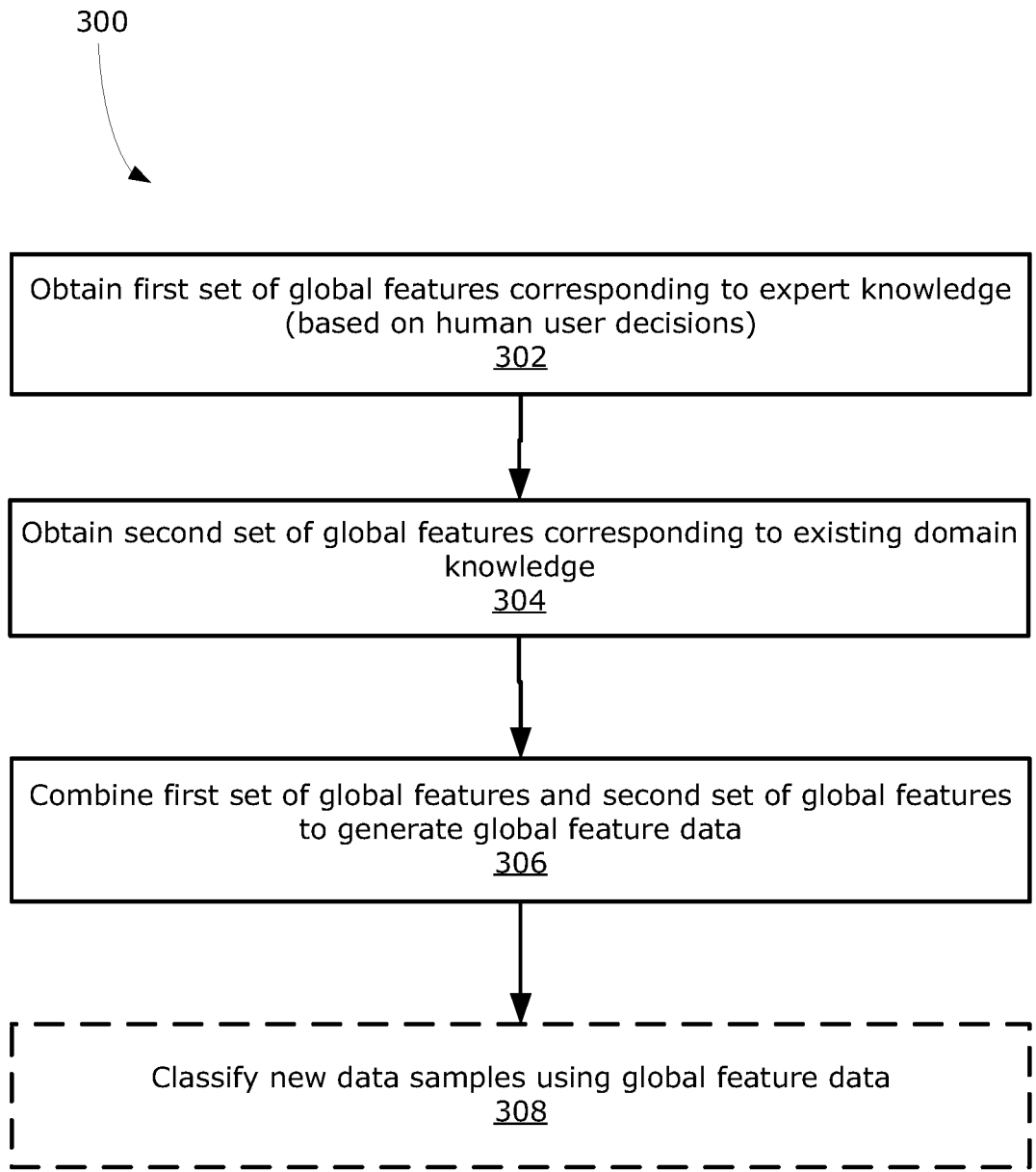
FIG. 3 is a flowchart showing operations of a method for generating global feature data, in accordance with the present disclosure.

FIG. 3 shows operations of a method 300 for generating global feature data 202. The operations of method 300 will be described with reference to the global feature generation module 200. However, it will be appreciated that the operations of method 300 may be performed by other means in some embodiments; for example, some operations may be performed using a first computing system, and other operations may be performed using a second computing system.

At 302, the global feature generation module 200 obtains a first set of global features 204. The first set of global features 204 correspond to expert knowledge, i.e., they are based on human user decisions (e.g., classification decisions made by a human expert). In the example global feature generation module 200 shown in FIG. 2, operation 302 is performed according to the steps of FIG. 4A, in which the expert knowledge is obtained through a human-in-the-loop active learning technique. An alternative embodiment is also described in which operation 302 is performed according to the steps of FIG. 4B, in which the expert knowledge is obtained through surveying human experts.

Figure 5:
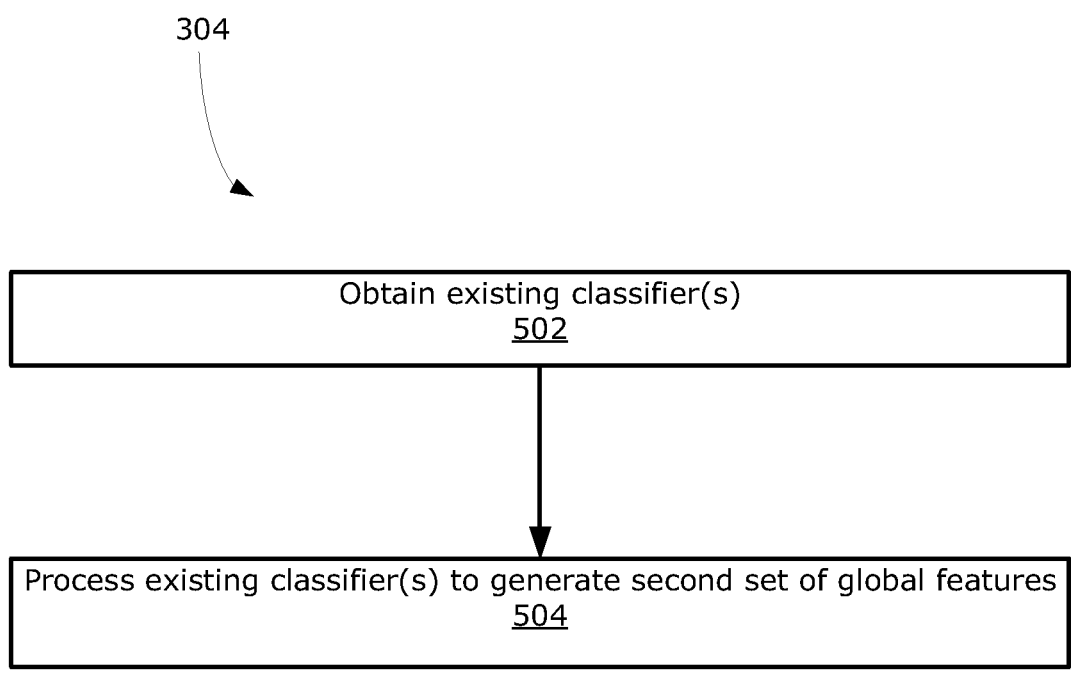
FIG. 5 is a flowchart showing steps of an example embodiment of the operation of generating the second set of global features of the method of FIG. 3.

At 304, the global feature generation module 200 obtains a second set of global features 206. The second set of global features 206 correspond to existing domain knowledge, such as known associations or correlations between membership in a class and values of one or more global features. FIG. 5 shows steps of an example embodiment of operation 304, in which the domain knowledge is obtained from one or more existing classifiers (i.e. classification models) trained or configured to classify data samples based on global features.

At 306, the knowledge combination submodule 238 of the global feature generation module 200 combines the first set of global features 204 and second set of global features 206 to generate the global feature data 202. The knowledge combination submodule 238 may combine the first set of global features 204 and second set of global features 206 using a union operation: i.e., the global features included in the combined global feature data 202 consist of all global features in the first set 204, as well as all global features in the second set 206 that are not in the first set 204. In some embodiments, the global feature data 202 may also generate, as part of the global feature data 202, logic for applying the combined global features to classify data samples, as described in the Summary section above. In some embodiments, the additional logic is based at least in part on additional logic associated with the first set 204 and/or second set 206 of global features. For example, logic associated with the first set of global features 204 may enable the performance of a classification task using the first set of global features 204 by generating a polynomial function of several numeric values of global features included in the first set 204, with the classification result being based on whether the value of the polynomial function for a given data sample exceeds a threshold. It will be appreciated that other logic may be used to generate a classification result based on values of a data sample of one or more global features included in the first set 204.

The global feature data 202 can be used to perform a classification task on data samples, either by itself or in combination with additional logic. Use of the global feature data 202 to perform the classification task on data samples is described below with reference to the combined global features classification module 600 of FIG. 6.

In an example embodiment which will be described in greater detail throughout the rest of the Description section, the classification task is a text classification task, the global feature data is keyword data, the first set of global features comprises a plurality of keywords extracted from the trained active learning-based classification model 212A, the one or more classification models (i.e. the existing classifier(s) 222) comprise one or more keywords models as described in the Background section above, and the second set of global features comprises a plurality of keywords extracted from the one or more keyword models. In this example, the global feature data 202 generated by the global feature generation module 200 for use in the text classification task may be referred to as a "Keyword++" model, because it is constructed as a keyword model (as described in the Background section above) using keywords (i.e. second set of global feature data 206) from existing keyword models used in the problem domain (i.e. existing classifier(s) 222) combined with keywords (i.e. first set of global feature data 204) extracted from a human-in-the-loop active learning-based classification model (i.e. trained AL-based classification model 212A). Testing data regarding the training and classification performance of an example Keyword++ model is described below with reference to the combined global features classification module 600 of FIG. 6.

Figure 4A:
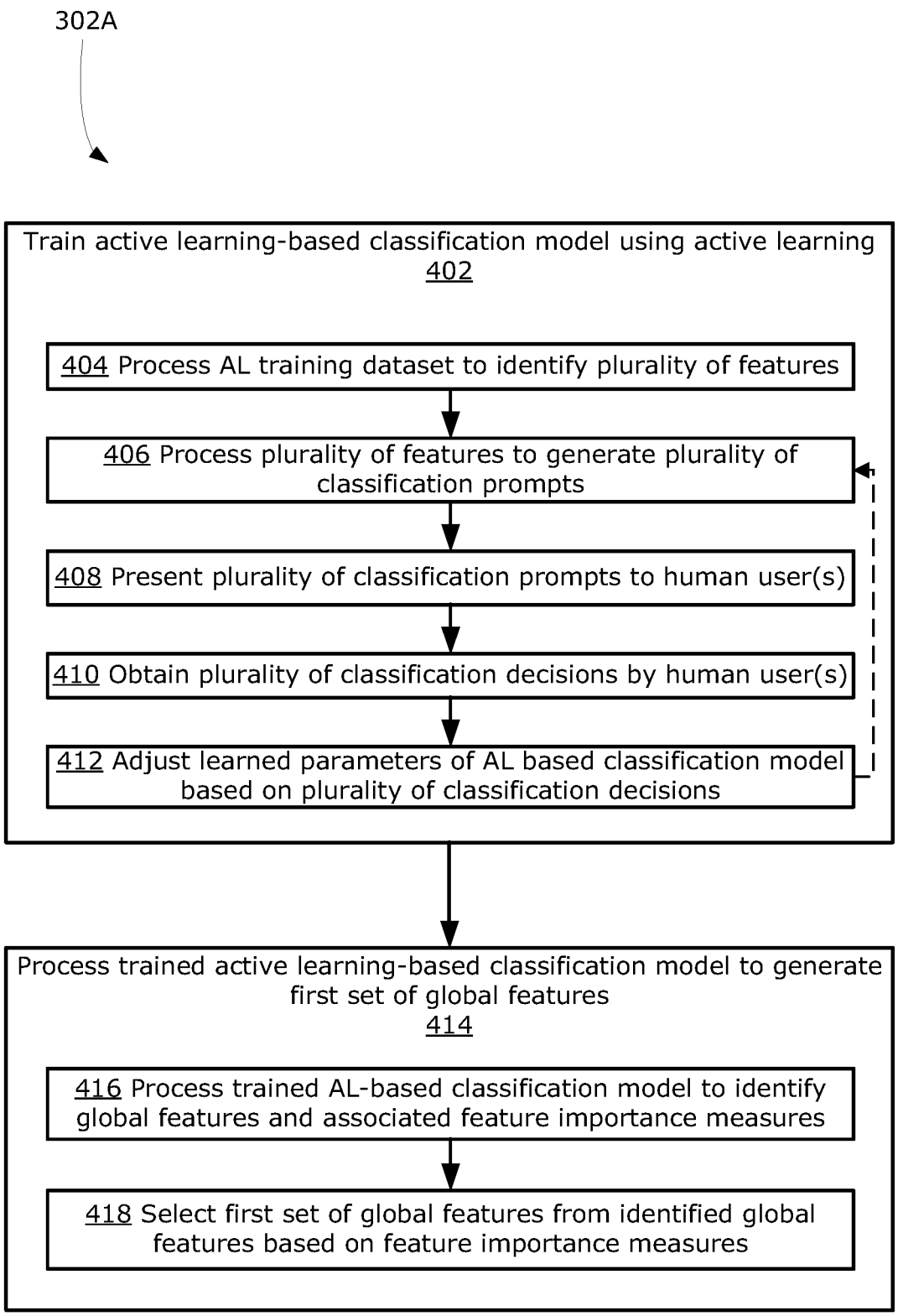
FIG. 4A is a flowchart showing steps of a first example embodiment of the operation of generating the first set of global features of the method of FIG. 3.

FIG. 4A shows steps of a first example embodiment 302A of the operation 302 of generating the first set of global features 204 of the method 300 of FIG. 3. In this example embodiment, the expert knowledge (i.e. first set of global features 204) is obtained by training a classification model using active learning (i.e., based on classification decisions made by one or more human users), then extracting the first set of global features from the trained model (i.e. trained AL-based classification model 212A).

At 402, the active learning-based classification model 212 is trained by the AL training submodule 232 using active learning to generate the trained active learning-based classification model 212A. Step 402 includes steps 404 through 412. It will be appreciated that step 402 is consistent with known approaches to training a classification model using active learning.

At 404, the AL training dataset 208 is processed by the AL training submodule 232 to identify a plurality of features. In some embodiments, the features are global features of the data samples in the AL training dataset 208. The plurality of features identified by the AL training submodule 232 define a feature space that will be operated upon to perform the classification task. Thus, a data sample's values of the plurality of features will form the basis for classifying the data sample according to the classification task.

In some embodiments, step 404 includes preprocessing the data samples of the AL training dataset 208. For example, in some embodiments an existing AL data labeler may be used to perform the active learning training process at steps 406 through 412 (i.e. a software platform or package configured to perform active learning-based classifier training). The data samples of the AL training dataset 208 may be preprocessed at step 404 into a format that is acceptable by the existing AL data labeler. In the context of a text classification task based on keywords, preprocessing may include stemming the input (i.e. the data samples of the AL training dataset 208) and removing stop words. Stemming reduces duplication of words and increases the density of the training data. For example, the words 'code', 'codes', 'coding', and 'coded' all represent the same meaning, and it is not typically useful to record the frequency of each of these words separately. The stemming process helps to reduce these words to their common root (e.g., 'cod*') and record the overall frequency of the root based on the frequency of each separate word. In the same vein, words like 'and', 'or', etc., (i.e., stop words) do not typically add information to the training data. Therefore, the process of removing stop words simplifies the AL training dataset 208. Stop words may be removed using various methods available in common programming languages like Python or R.

After stemming and removing stop words, the preprocessing process at step 404 may convert the data samples into a format acceptable by the existing AL data labeler. Machine learning algorithms typically accept data only in specific formats, and the raw (i.e., non-preprocessed) data samples cannot be provided as input to the machine learning algorithm of the existing AL data labeler as-is. Instead, may be necessary to transform the data samples into an acceptable format. For instance, if the data samples to be labelled (i.e. the AL training dataset 208) are made up of textual data (i.e. text data samples), the data samples can be transformed using techniques such as TF-IDF transformation or bag-of-words. TF-IDF transformation assigns weight to each word in a text data sample based on how relevant each word in a text data sample is in comparison with the other text data samples in the AL training dataset 208.

At 406, the AL training submodule 232 processes the plurality of features (identified at step 404) to generate a plurality of classification prompts 242. The AL training submodule 232 uses known active learning techniques to generate prompts that will allow the classification task to be performed with a minimum of human input. In some embodiments, the classification prompts 242 may ask the user to make classification decisions regarding identified features based on the information or entropy inherent in the feature's possible values, in accordance with principles of information theory. Thus, the classification prompts 242 are intended to resolve the greatest amount of uncertainty within the active learning-based classification model 212 using the smallest number of classification prompts 242.

At 408, the classification prompts 242 are presented to one or more human users by sending the classification prompts 242 to one or more user devices 118, for example via the network interface 106 of the computing system 100. In some embodiments, each classification prompt 242 is presented to a user as a graphical user interface element prompting the user for input responsive to the classification prompt 242. The user input provided in response to the prompt is captured by the user device 118 and encoded as a classification decision 244 made by the user based on the information in the classification prompt 242.

At 410, the classification decisions 244 responsive to the classification prompts 242 are obtained by the AL training submodule 232, for example from the user devices (118) via the network interface 106.

At 412, the classification decisions 244 are processed by the AL training submodule 232 and used to adjust the learned parameter values of the active learning-based classification model 212, in accordance with known machine learning techniques. Essentially, the classification decisions 244 made by the human user(s) are used as semantic labels of the data samples for a supervised learning process, as described in the discussion of active learning in the Background section.

In some embodiments, steps 406 through 412 are performed in sequence, followed by further iterations of the sequence of steps 406 through 412, as the classification prompts 242 may be generated one at a time based on previously received classification decisions 244 and consequent updates to the learned parameters in step 412.

At the end of step 402 (i.e. after the final iteration of step 412), the active learning-based classification model 212 has been transformed into the trained active learning-based classification model 212A due to repeated adjustments to its learned parameter values. The end of the training process (i.e. step 402) may be triggered using known techniques, such as convergence of learned parameter values or other training termination conditions used in active learning.

In some embodiments, such as embodiments using an existing AL data labeler as described above with reference to step 404, the AL data labeler is constructed (i.e., the classification model driving the AL data labeler is trained) using known AL techniques. The constructed AL data labeler identifies a subset of highly relevant data samples from the AL training dataset 208 and queries the one or more human users (i.e., presents the classification prompts 242) for labels for these highly relevant data samples, as described with reference to step 406 above. Depending on the human users' answers (i.e., the classification decisions 244), the AL labeler continuously trains its internal AL-based classification model 212 (which may be any supervised machine learning model such as a support vector machine (SVM), a random forest model, etc.). Finally, the AL labeler may be configured to terminate the training process after presenting the minimum possible number of classification prompts 242 to the human user(s) to identify labels for all the data samples in the AL training dataset 208.

It will be appreciated that some embodiments may perform step 402 (training the AL-based classification model 212) in accordance with active learning techniques known in the art. However, the method 300 diverges from conventional approaches to active learning-based classification in step 414 of operation 302A (i.e. extraction of expert knowledge from the trained AL-based classification model 212A) and in operations 304-308 of method 300.

At 414, the trained active learning-based classification model 212A is processed by the expert knowledge extraction submodule 234 to generate the first set of global features 204. Step 414 includes steps 416 and 418.

At 416, the expert knowledge extraction submodule 234 processes the trained AL-based classification model 212A to identify global features and associated feature importance measures. Feature importance refers to techniques that assign a score (i.e., a feature importance measure) to input features (e.g., the identified global features) based on how useful they are at predicting a target variable (in this case, the predicted variable is membership in a class). First, a plurality of global features are identified with respect to the trained AL-based classification model 212A: in some embodiments, the identified global features are the same features used to perform the active learning-based training of the AL-based classification model 212 at step 402. A respective feature importance measure is then identified in association with each identified global feature. In some embodiments, identification of the feature importance measure of each global feature is performed using a feature importance technique, such as permutation feature importance, on the trained active learning-based classification model 212A. In other embodiments, other feature importance techniques may be used to generate the feature importance measure, such as linear regression, logistic regression, decision trees, random forest regression, or stochastic gradient boosting.

In some embodiments using an existing AL data labeler, step 416 includes an initial sub-step of extracting the trained AL-based classification model 212A from the AL data labeler that has been constructed during the training step 402. Once the AL data labeler finishes training at the end of step 412, the AL data labeler includes within its architecture the trained AL-based classification model 212A (e.g., a trained SVM model) that is capable of predicting the label for a given data sample. This trained model 212A may be extracted from the constructed AL data labeler and stored to the memory 110, for example by storing the values of the hyperparameters and learned parameters of the trained AL-based classification model 212A.

At 418, the expert knowledge extraction submodule 234 selects the first set of global features 204 from the identified global features based on their respective feature importance measures. Generally, a subset of the model's global features having the highest feature importance (i.e. the highest feature importance score indicated by the feature importance measure) will be selected as the first set of global features 204. Thus, for example, if the trained AL-based classification model 212A has been trained on an AL training dataset 208 including 5,000 global features, the global features identified at step 416 may constitute all 5,000 global features, ranked in terms of their respective feature importance measure. At step 418, the top ten global features may be selected as constituting the first set of global features 204, representing the ten global features that have the greatest predictive power with respect to the classification task for which the trained AL-based classification model 212A has been trained.

In the ongoing example of the classification task of classifying bug-fix and non-bug-fix software commits based on the presence of keywords as a global feature of the text data samples, the feature importance measure may indicate which keywords are most predictive in identifying whether a given software commit is a bug-fix software commit. For example, the keywords 'bug', 'fix', 'feature', 'error', and 'mistake' could be identified as the top 5 most important keywords (i.e., the five global features having the highest feature importance measures) that have the greatest power in assisting the trained AL-based classification model 212A to distinguish between bug-fix software commits and non-bug-fix software commits. Some embodiments may select the top n (e.g., n=5 or n=10) most important global features as the first set of global features 204 corresponding to expert knowledge based on the classification decisions 244 made by experts (i.e., the human users).

FIG. 5 shows steps of an example embodiment of the operation 304 of generating the second set of global features 206 of the method 300 of FIG. 3. It will be appreciated that existing domain knowledge corresponding to the second set of global features 206 may be obtained in various ways in different embodiments. For example, in some problem domains (i.e. with respect to certain classification tasks), certain keywords or other global features are well-known to correlate with membership in certain classes based on past research. Such existing domain-specific knowledge may be used as the second set of global features 206 in some embodiments.

At 502, one or more existing classifiers 222 are obtained by the domain knowledge extraction submodule 236. The existing classifiers 222 may be classification models trained or otherwise constructed or configured to classify data samples according to the classification task based on global features of the data samples. In some embodiments, each existing classifier 222 is configured or trained using a respective training dataset. For example, in the context of keyword-based classification of text data samples to identify bug-fix software commits, each existing classifier 222 may be a keyword classifier (as described in the Background section) constructed based on a respective dataset consisting of software commits for a given software codebase. Thus, for example, the existing classifiers 222 may include a first keyword classifier based on the ABINIT software commit text dataset, a second keyword classifier based on the MDAnalysis software commit text dataset, a third keyword classifier based on the LAMMPS software commit text dataset, and a fourth keyword classifier based on the libMesh software commit text dataset.

At 504, the existing classifiers 222 are processed by the domain knowledge extraction submodule 236 to generate the second set of global features 206. In the example of existing classifiers 222 that are trained keyword-based classification models, the domain knowledge extraction submodule 236 may generate the second set of global features 206 as a set of keywords extracted from the existing classifiers 222. In some embodiments, the second set of global features 206 may include all keywords having a feature importance measure above a certain threshold. In some embodiments, the second set of global features 206 may include the top n (or top m, e.g. m=4) keywords of each existing classifier 222 ranked in order of the feature importance measure.

As described above with reference to operation 306 of method 300, the extracted expert knowledge (i.e. the first set of global features 204) is then combined with the existing domain knowledge (i.e., the second set of global features 206, such as the keywords extracted from the existing classifiers 222). This combination may be performed through a union operation, as described above. In some embodiments performing keyword-based classification of text data samples as bug-fix software commits or non-bug-fix software commits, several keywords are typically used for labelling data samples. At operation 306, the knowledge combination submodule 238 performs a union between the first set of global features 204 and the second set of global features 206 to generate the global feature data 202, which forms the basis for the combined global features classification module 600, using a classifier referred to as a "Keyword++ model" and described below with reference to FIG. 6.

Figure 4B:
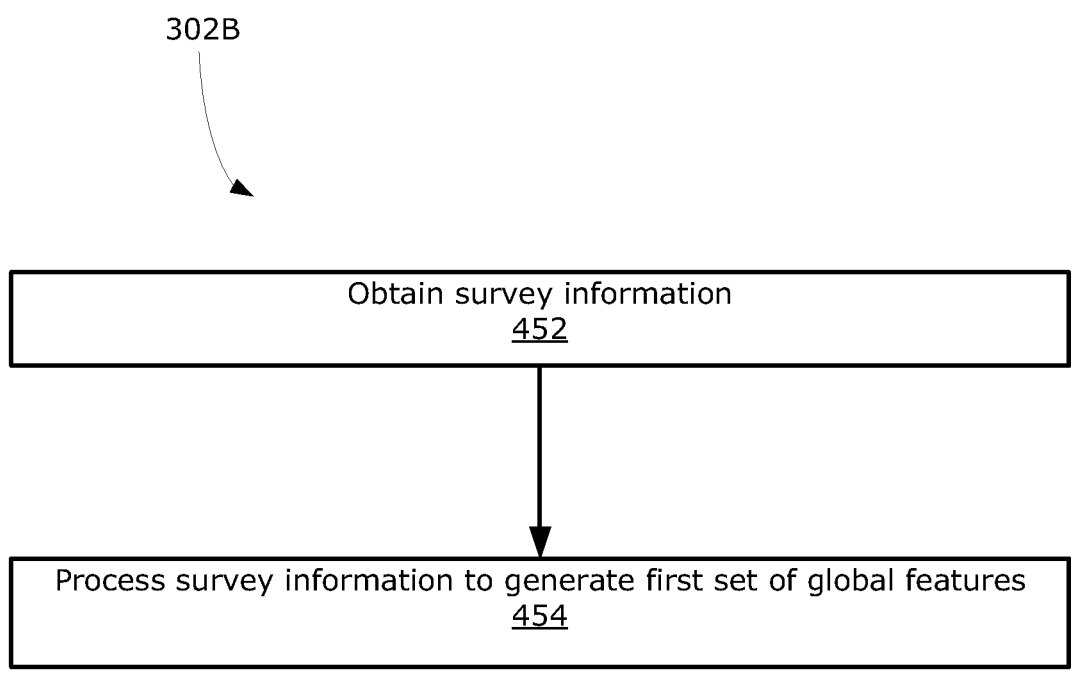
FIG. 4B is a flowchart showing steps of a second example embodiment of the operation of generating the first set of global features of the method of FIG. 3.

FIG. 4B shows steps of a second example embodiment 302B of the operation 302 of generating the first set of global features 204 of the method 300 of FIG. 3.

At 452, survey information is obtained, including survey responses of the one or more human users. The survey information may identify one or more global features deemed relevant to the classification task by the human user(s). In some embodiments, the survey information may indicate a plurality of classification decisions 244 made by the human user(s), in response to survey questions phrased analogously to a plurality of classification prompts 242.

At 454, the survey information is processed (e.g., by a survey processing submodule of the global feature generation module 200, not shown in FIG. 2). The survey responses of the one or more human users may be processed to identify or generate the first set of global features 204. For example, some embodiments may obtain survey responses from a large number of human experts, and perform statistical analysis of the survey responses to identify highly important features that the human experts in aggregate identify as being highly predictive with respect to the classification task.

In embodiments implementing the alternative operation 302B, the global feature generation module 200 may omit several components shown in FIG. 2, such as the AL training dataset 208, AL training submodule 232, AL-based classification model 212, classification prompts 242, classification decisions 244, trained AL-based classification model 212A, and expert knowledge extraction submodule 234. Instead, the global feature generation module 200 may include a survey analysis submodule as described above.

Example Combined Global Features Classification Module

Example embodiments will now be described with reference to the global feature generation module 200 of FIG. 1. Operation of the global feature generation module 200 will be described with reference to the block diagram of FIG. 2 as well as the flowcharts shown in FIGS. 3-5.

Figure 6:
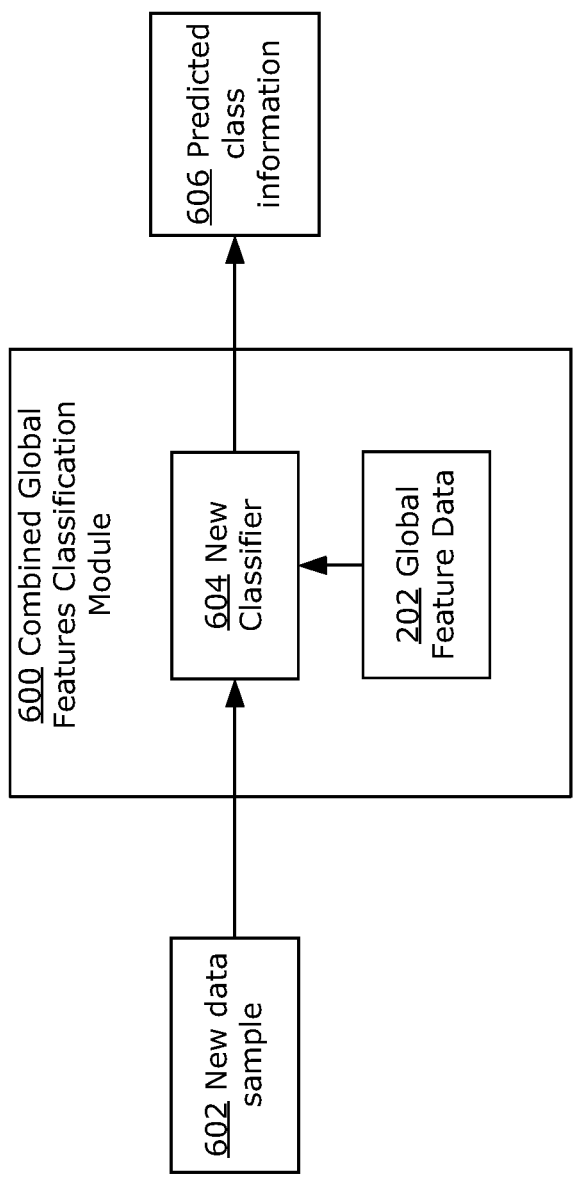
FIG. 6 is a block diagram showing operations of a combined global features classification module, in accordance with the present disclosure.

FIG. 6 shows a combined global features classification module 600 using the global feature data 202 to perform the classification task.

The combined global features classification module 600 includes a new classifier 604 that performs the classification task using the global feature data 202 generated by the global feature generation module 200 using method 300. As described above, the global feature data 202 may include sufficient logic to enable performance of the classification task; in some embodiments, however, the global feature data 202 include only a list or set of global features (such as a list of keywords), and the new classifier 604 may provide the logic used to apply the global feature data 202 to performance of the classification task (e.g., by classifying any data sample in a first class if and only if the data sample contains or exhibits at least one of the global features in the list or set, such as a text data sample that contains one of the keywords in the list). In the context of keyword-based classification of text samples, some embodiments of the new classifier 604 may perform the classification task based on the presence of any keyword in a list of keywords; in other embodiments, the new classifier 604 may perform a frequency-based keyword analysis such that only samples containing certain keywords at or at certain frequencies are classified in a given class. It will be appreciated that various keyword-based classification tasks may be performed using a combination of a keyword list and logic embodying a classification function.

In operation, the combined global features classification module 600 receives a new data sample 602, performs the classification task on the new data sample 602 using the new classifier 604 based on the global feature data 202, and thereby generates predicted class information 606. The predicted class information 606 may be a class label, or it may take another form such as logits corresponding to a probability distribution among two or more classes.

The classification task performance of an example Keyword++ model will now be described with reference to testing data. The classification task is the classification of software commit text data samples as bug-fix software commits or non-bug-fix software commits, as described above. The Keyword++ model used in the tests was generated as described above: the first set of global features 204 was obtained by extracting expert knowledge in the form of the top n keywords from a trained AL-based classification model 212A using operation 302A described above with reference to FIG. 4A, and the second set of global features 206 was obtained by extracting domain knowledge in the form of the five keywords used to classify bug-fix commits ("bug", "fix", "wrong", "error", "fail", "problem", and "patch") from the CommitGuru keyword classification model described by C. Rosen, B. Grawi, and E. Shihab, "Commit guru: analytics and risk prediction of software commits," in Proceedings of the 2015 10th joint meeting on foundations of software engineering, 2015, pp. 966-969.

The test data, as shown in Table 1 below, indicates that the Keyword++ model performs at least as well as existing approaches described in the Background section, and sometimes better. For each of the four datasets, the classification task performance of a keyword labeler (indicated by the "HK" rows in Table 1) and an active learning labeler (indicated by the "AL" rows in Table 1), both trained specifically using their respective dataset, are compared to the performance of the single Keyword++ model (indicated by the "K++" rows in Table 1). The specific keyword labeler used in the tests (i.e., "HK") was the labeler described by L. P. Hattori and M. Lanza, "On the nature of commits," in 2008 23rd IEEE/ACM International Conference on Automated Software Engineering-Workshops. IEEE, 2008, pp. 63-71.

It will be appreciated that the Keyword++ outperforms each of the other dataset-specific data labelers, with respect to each of the four datasets, in terms of the G-score (i.e. the harmonic mean of recall and the false alarm rate, shown by the G column). Even in terms of recall (i.e. the REC column), the Keyword++ model outperforms the other approaches in 2 out of the 4 datasets (MDAnalysis and LAMMPS).

TABLE 1

Performance test results comparing performance of Keyword++ to existing keyword and active learning classifiers (effect size is denoted in parentheses, i.e. S = small, M = medium, L = large, otherwise negligible;asterisk * indicates statistical significance (p < 0.05))

| Dataset | Labelling Approach | REC | G |
|---|---|---|---|
| ABINIT | AL | 0.97 | |
| | HK | 0.89 | 0.90 |
| | K++ | 0.94 | 0.93*(L) |
| MDAnalysis | AL | 0.53 | |
| | HK | 0.82 | 0.81 |
| | K++ | 0.84*(L) | 0.82*(M) |
| LAMMPS | AL | 0.97 | — |
| | HK | 0.91 | 0.91 |
| | K++ | 0.99*(L) | 0.92*(L) |
| libMesh | AL | 0.97 | |
| | HK | 0.84 | 0.84 |
| | K++ | 0.96 | 0.90*(M) |

The tested Keyword++ data labeler also exhibited greater stability than the AL data labeler, which is the best-performing data labeler of the existing approaches described in the Background section. In the tests, to identify the bug-fix software commits in each of the studied datasets, each data labeler was executed for 100 iterations, with classification recall performance measured for each iteration. An interquartile range was then calculated for each classifier's recall performance over 100 iterations. In Table 2, it can be observed that the Keyword++ model exhibits a smaller interquartile range for the REC score (IQR_R) than the AL data labeler. Such a result suggests that the Keyword++ exhibits greater stability than the AL data labeler.

TABLE 2

Stability test results comparing interquartile range of REC and G scores for Keyword++ to existing keyword and active learning classifiers

| Dataset | Labelling Approach | IQR_R |
|---|---|---|
| ABINIT | AL | 0.01 |
| | K++ | 0.01 |
| MDAnalysis | AL | 0.40 |
| | K++ | 0.01 |
| LAMMPS | AL | 0.29 |
| | K++ | 0.01 |
| libMesh | AL | 0.54 |
| | K++ | 0.03 |

The tested keyword++ data labeler also exhibited greater robustness to the errors incurred by the human-in-the-loop (i.e. the human user(s)) when building the AL data labeler. Tables 3a, 3b, and 3c present the recall, false alarm rate, and G-score performance of the Keyword++ model under different levels of human labelling error when building the underlying AL data labeler over 100 iterations. All AL data labelers tend to suffer from the problem of sensitivity to human labeling error. However, even at a 40% human labelling error rate, the loss in performance of the Keyword++ model is relatively small compared to the AL data labeler.

TABLE 3a

Robustness test results showing median recall (REC) for Keyword++ at different human error rates

| Dataset | Median Recall (REC) | | | |
|---|---|---|---|---|
| | Labelling Error 10% | Labelling Error 20% | Labelling Error 30% | Labelling Error 40% |
| ABINIT | 0.92 | 0.89 | 0.75 | 0.89(L) |
| MDAnalysis | 0.94 | 0.94 | 0.86 | 0.89(L) |
| LAMMPS | 0.93 | 0.94 | 0.95 | 0.89(L) |
| libMesh | 0.94 | 0.93 | 0.94 | 0.84(L) |

TABLE 3b

Robustness test results showing median false alarm rate for Keyword++ at different human error rates

| Dataset | Median False Alarm Rate | | | |
|---|---|---|---|---|
| | Labelling Error 10% | Labelling Error 20% | Labelling Error 30% | Labelling Error 40% |
| ABINIT | 024 | 0.31 | 0.34 | 0.27 |
| MDAnalysis | 0.52 | 0.64 | 0.65 | 0.58 |
| LAMMPS | 0.19 | 0.21 | 0.22 | 0.19 |
| libMesh | 0.66 | 0.67 | 0.63 | 0.36*(L) |

TABLE 3c

Robustness test results showing median G-score for Keyword++ at different human error rates

| Dataset | Median G-score | | | |
|---|---|---|---|---|
| | Labelling Error 10% | Labelling Error 20% | Labelling Error 30% | Labelling Error 40% |
| ABINIT | 0.82 | 0.76 | 0.70 | 0.78*(L) |
| MDAnalysis | 0.64 | 0.52 | 0.49 | 056 |
| LAMMPS | 0.87 | 0.86 | 0.84 | 0.84 |
| libMesh | 0.49 | 0.48 | 0.52 | 0.73*(M) |

The tested Keyword++ model also exhibited greater generalizability than both the keyword and AL data labelers. In Table 4, the performance of the Keyword++ model (recall and G-score), trained on a first dataset and deployed to classify a second dataset, is compared to the performance of AL data labelers trained on the dataset being tested. The Training Dataset column in Table 4 is the dataset on which the Keyword++ model was trained, and the Test Dataset column is the dataset on which the Keyword++ model is tested. The "-" row indicates the performance of the Keyword++ model trained on the same dataset being tested. It can be observed from Table 4 that the performance of the Keyword++ model on the training dataset is comparable to performance on other datasets. Such a result highlights that the Keyword++ approach of combining domain knowledge with expert knowledge leads to more generalizable data labelers. These data labelers can be trained once (i.e., trained using a single dataset) and used everywhere within the problem domain, unlike existing AL data labeler approaches which have to be trained separately on every dataset.

TABLE 4

Generalizability test results comparing performance of Keyword++ trained on the same dataset being tested to performance of Keyword++ trained on a different dataset

| Training Dataset | Testing Dataset | REC | GSC |
|---|---|---|---|
| ABINIT | — | 0.94 | 0.91 |
| | MDAnalysis | 0.84*(L) | 0.81*(L) |
| | LAM MPS | 0.91*(L) | 0.90*(L) |
| | libMesh | 0.89*(L) | 0.87*(L) |
| MDAnalysis | — | 0.84 | 0.81 |
| | ABINIT | 0.90*(L) | 0.91*(L) |
| | LAMMPS | 0.91*(L) | 0.90*(L) |
| | libMesh | 0.89*(L) | 0.87*(L) |
| LAMMPS | — | 0.99 | 0.94 |
| | ABINIT | 0.90*(L) | 0.91*(L) |
| | MDAnalysis | 0.84*(L) | 0.73*(L) |
| | libMesh | 0.96*(L) | 0.90*(L) |
| libMesh | — | 0.96 | 0.90 |
| | ABINIT | 0.90*(L) | 0.91*(L) |
| | MDAnalysis | 0.99*(L) | 0.82*(L) |
| | LAMMPS | 0.84*(L) | 0.94*(L) |

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

Further aspects and examples of the present disclosure are presented in the Appendix attached hereto, the entirety of which is hereby incorporated into the present disclosure.

The invention claimed is:

1. A method for automatically generating, using a computing system, global feature data for use in performing a classification task, comprising:
   obtaining a first set of global features generated based on decisions made by one or more human users representing expert knowledge by:
      training an active learning-based classification model using active learning based on the expert knowledge with respect to an active learning training dataset, thereby obtaining a trained active learning-based classification model; and
      processing the trained active learning-based classification model to generate the first set of global features;
   obtaining a second set of global features generated based on one or more trained classification models, each trained classification model being trained using a respective training dataset; and
   combining the first set of global features and the second set of global features to generate the global feature data.

2. The method of claim 1, wherein:
   training the active learning-based classification model comprises:
      processing at least a portion of the active learning training dataset to generate a plurality of features;
      processing the plurality of features to generate a plurality of classification prompts;
      presenting a plurality of classification prompts to the one or more human users via one or more user devices;
      obtaining a plurality of classification decisions based on user input received from the one or more user devices; and
      adjusting a plurality of learned parameters of the active learning-based classification model based on the plurality of classification decisions.

3. The method of claim 2, wherein:
   the active learning-based classification model comprises a support-vector machine model.

4. The method of claim 2, wherein:
   processing the trained active learning-based classification model to generate the first set of global features comprises:
      processing the trained active learning-based classification model to identify:
         a plurality of global features; and
         a respective feature importance measure associated with each global feature of the plurality of global features; and
      selecting the first set of global features from the plurality of global features based on the respective feature importance measures of the first set of global features.

5. The method of claim 4, wherein:
   processing the trained active learning-based classification model to identify a respective feature importance measure associated with each global feature of the plurality of global features comprises performing permutation feature importance on the trained active learning-based classification model.

6. The method of claim 1, wherein:
   the classification task is a text classification task;
   the global feature data comprises keyword data;
   the first set of global features comprises a plurality of keywords extracted from the trained active learning-based classification model;
   the one or more classification models comprise one or more keywords models; and
   the second set of global features comprises a plurality of keywords extracted from the one or more keyword models.

7. The method of claim 1, wherein:
   obtaining the first set of global features comprises:
      obtaining survey information comprising survey responses of the one or more human users; and
      processing the survey information to generate the first set of global features.

8. The method of claim 1, further comprising:
   using the global feature data to perform the classification task on a plurality of data samples that are not present in the one or more training datasets or in the active learning training dataset.

9. A computing system comprising:
   a processing system comprising one or more processor devices; and
   a memory storing instructions which, when executed by the processing system, cause the system to generate global feature data for use in performing a classification task by:
      obtaining a first set of global features generated based on decisions made by one or more human users representing expert knowledge by:
         training an active learning-based classification model using active learning based on the expert knowledge with respect to an active learning training dataset, thereby obtaining a trained active learning-based classification model; and
         processing the trained active learning-based classification model to generate the first set of global features;
      obtaining a second set of global features generated based on one or more trained classification models, each trained classification model being trained using a respective training dataset; and
      combining the first set of global features and the second set of global features to generate the global feature data.

10. The computing system of claim 9, wherein:
    training the active learning-based classification model comprises:
       processing at least a portion of the active learning training dataset to generate a plurality of features;
       processing the plurality of features to generate a plurality of classification prompts;
       presenting a plurality of classification prompts to the one or more human users via one or more user devices;
       obtaining a plurality of classification decisions based on user input received from the one or more user devices; and
       adjusting a plurality of learned parameters of the active learning-based classification model based on the plurality of classification decisions.

11. The computing system of claim 10, wherein:
the active learning-based classification model comprises a support-vector machine model.

12. The computing system of claim 10, wherein:
generating a model representation of the active learning-based classification model comprises:
processing the trained active learning-based classification model to identify:
a plurality of global features; and
a respective feature importance measure associated with each global feature of the plurality of global features; and
selecting the first set of global features from the plurality of global features based on the respective feature importance measures of the first set of global features.

13. The computing system of claim 12, wherein:
processing the trained active learning-based classification model to identify a respective feature importance measure associated with each global feature of the plurality of global features comprises performing permutation feature importance on the trained active learning-based classification model.

14. The computing system of claim 9, wherein:
the classification task is a text classification task;
the global feature data comprises keyword data;
the first set of global features comprises a plurality of keywords extracted from the trained active learning-based classification model;
the one or more classification models comprise one or more keywords models; and
the second set of global features comprises a plurality of keywords extracted from the one or more keyword models.

15. The computing system of claim 9, wherein:
obtaining the first set of global features comprises:
obtaining survey information comprising survey responses of the one or more human users; and
processing the survey information to generate the first set of global features.

16. The computing system of claim 9, further comprising:
using the global feature data to perform the classification task on a plurality of data samples that are not present in the one or more training datasets or in the active learning training dataset.

17. A non-transitory computer-readable medium having instructions tangibly stored thereon, wherein the instructions, when executed by a processing system, cause the processing system to perform the method of claim 1.

18. A non-transitory computer-readable medium having tangibly stored thereon global feature data for use in performing a classification task, the global feature data being generated by:
obtaining a first set of global features generated based on decisions made by one or more human users representing expert knowledge by:
training an active learning-based classification model using active learning based on the expert knowledge with respect to an active learning training dataset, thereby obtaining a trained active learning-based classification model; and
processing the trained active learning-based classification model to generate the first set of global features;
obtaining a second set of global features generated based on one or more trained classification models, each trained classification model being trained using a respective training dataset; and
combining the first set of global features and the second set of global features to generate the global feature data.

* * * * *